(12) United States Patent
Akhtar et al.

(10) Patent No.: US 6,172,973 B1
(45) Date of Patent: Jan. 9, 2001

(54) APPARATUS AND METHOD FOR REDUCING DELAY FOR VOICE OVER ATM USING CO-LOCATED SWITCHES

(75) Inventors: Shahid Akhtar; Haseeb Akhtar, both of Garland, TX (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/932,094

(22) Filed: Sep. 17, 1997

(51) Int. Cl.[7] ............................. H04L 12/66; H04L 12/56
(52) U.S. Cl. ......................... 370/354; 370/356; 370/392; 370/397
(58) Field of Search ................................... 370/351, 352, 370/468, 400, 392, 255, 256, 354, 356, 465, 395, 397, 294

(56) References Cited

U.S. PATENT DOCUMENTS

| 5,204,857 |   | 4/1993 | Obara . |         |
|-----------|---|--------|---------|---------|
| 5,483,527 |   | 1/1996 | Doshi et al. . |  |
| 5,526,353 | * | 6/1996 | Henley et al. | 370/392 |
| 5,600,641 | * | 2/1997 | Duault et al. | 370/400 |
| 5,734,653 |   | 3/1998 | Hiraiwa et al. . | |
| 5,764,644 |   | 6/1998 | Miska et al. | 370/465 |
| 5,862,136 | * | 1/1999 | Irwin | 370/395 |
| 5,889,765 | * | 3/1999 | Gibbs | 370/294 |
| 5,946,323 | * | 8/1999 | Eakins et al. | 370/468 |
| 5,956,334 | * | 9/1999 | Chu et al. | 370/352 |
| 6,014,378 | * | 1/2000 | Christie et al. | 370/356 |
| 6,067,299 | * | 5/2000 | DuRee | 370/397 |

FOREIGN PATENT DOCUMENTS

| 0 711 052 A1 | 5/1996 | (EP) . |
| 2 282 027    | 8/1994 | (GB) . |
| WO 94/11975  | 5/1994 | (WO) . |
| WO 97/03526  | 1/1997 | (WO) . |
| WO 97/16005  | 5/1997 | (WO) . |

OTHER PUBLICATIONS

P Heywood; Data Communication, vol. 25, No. 16, Nov. 21, 1996, pp. 33–34, XP002087865 us see p. 34, line 7–line 11; figure 1.

* cited by examiner

Primary Examiner—Hassan Kizou
Assistant Examiner—John Pezzlo
(74) Attorney, Agent, or Firm—Haynes & Boone, LLP

(57) ABSTRACT

The instant invention allows control of voice transmission from end user to end user by common channel signaling without the repeated conversion delays encountered by entering and exiting the standard voice network and an ATM network. The control is accomplished in parallel over the standard public switch telephone network while the voice "data" is transported over an ATM "data" network. Each ATM node has with it a co-located PSTN voice switch. A pair of control links are used to communicate between the two co-located ATM and TDM switches.

12 Claims, 3 Drawing Sheets

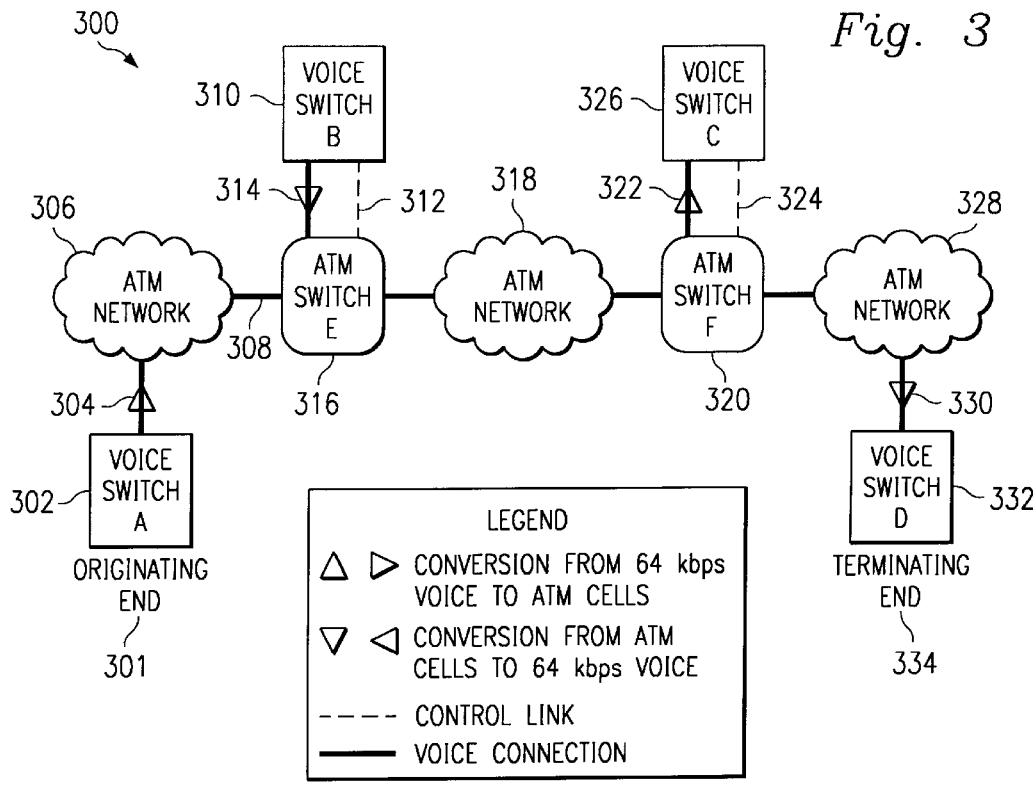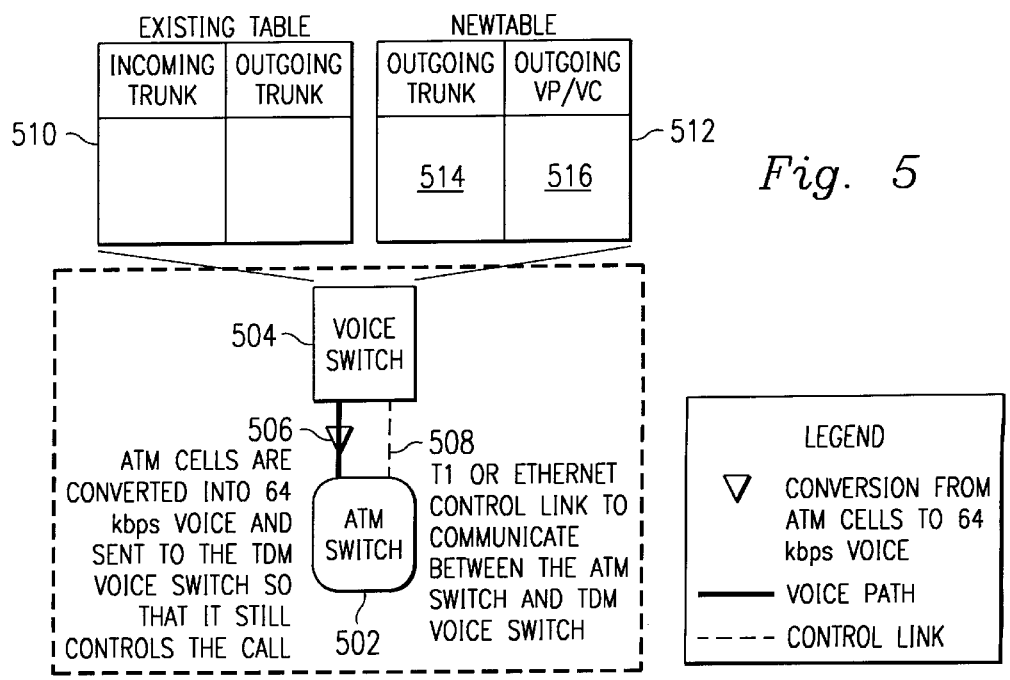

APPARATUS AND METHOD FOR REDUCING DELAY FOR VOICE OVER ATM USING CO-LOCATED SWITCHES

BACKGROUND OF THE INVENTION

Field of the Invention

The present invention relates to telecommunications in general and in particular to sending voice over high speed digital communication circuits.

DESCRIPTION OF THE RELATED ART

FIG. 1 illustrates a typical network with voice over ATM capability. Since voice switching is done in a time division multiplexing (TDM) domain, the ATM background is used only as a transport network. At least two TDM voice switches will typically be connected to the ATM backbone network at each originating and terminating end. TDM voice switches use 64 KB per second samples of digitized voice for it's switching fabric. Once the switching is done these voice samples are packetized into ATM cells which are 53 bytes long before sending them through the ATM network. On the terminating side, the ATM cells are again depacketized and converted into voice samples before entering the TDM voice switch.

During each portion of the transmission, the digitized TDM voice signal is packetized and de-packetized. Each portion of the network traveled introduces its own delay. These delays, while insignificant in communicating standard data take on greater significance when voice comes into play. Delays in voice conversations soon become unacceptable and are unpleasant to the ear.

There are several delays to be considered. The cell fill delay is the delay required to fill a 53 byte ATM cell with 64 KBPS TDM voice samples. It requires about 6 ms (376 bits divided by 64,000 bps) to fill an ATM cell with TDM voice samples, assuming one cell is used per voice call. This delay increases as voice compression is used in the network. In fact, the use of compression increases the amount of delay by a factor of the compression ratio. For example, if the voice is compressed at a 4 to 1 ratio, which is typically used, then it would increase the delay by a factor of four which is 4 by 6 ms equals 24 ms at the originating end.

On the terminating side, another delay is introduced to allow all the ATM cells to arrive into a smoothing out buffer before playing the voice. The purpose of the smoothing out is to eliminate the probability of a cell not being present at the time of playing of the voice. This delay is sometimes called cell playout delay and is calculated to be less than 7 ms for both 4 to 1 compression networks and for 8 to 1 compression networks.

The use of voice compression in the network adds to yet another end to end delay. The most commonly used 4 to 1 compression by adaptive differential pulse code modulation (ADPCM) technology typically involves a delay of 25 ms. A new technology called low delay-code excited linear prediction (LD-CELP), incurs the delay of 2 ms for 8 to 1 compression. All things considered, a minimum delay of 56 ms for 4 to 1 compression to 57 ms for 8 to 1 compression is added for a simple network with 2 voice switches as shown in FIG. 1. Reality is however, that most voice calls will go through at least 4 or more voice switches at multiple entry and exit points to and from the ATM backbone network. These entries and exit will introduce significantly more delay to the process.

FIG. 2 illustrates an example of a network with 4 TDM voice switches and the respective interfaces to ATM networks. In this scenario voice packets interact with 3 separate ATM networks. As mentioned above each time 2 voice switches interact with an ATM network, a delay of 56 to 57 ms is added to the voice transmission. The network illustrated in FIG. 2 will incur a delay of 168 to 171 ms depending on the voice compression factor (4 to 1 or 8 to 1). The acceptable delay for the real-time voice transmission is required to be less than 130 to 200 ms. Any greater delay results in very unpleasant conversation between the end users. The increased frequency of compression and decompression makes matters worse by introducing errors in the voice signal. It is therefore desirable to eliminate and/or reduce the number of exit and entry points between the voice network and the ATM network.

There is accordingly a need for a new method and apparatus for voice communication over data networks in order to solve or ameliorate one or more of the above-described problems.

SUMMARY OF THE INVENTION

The instant invention allows control of voice transmission from end user to end user by common channel signaling without the repeated conversion delays encountered by entering and exiting the standard voice network and an ATM network. The control is accomplished in parallel over the standard public switch telephone network while the voice "data" is transported over an ATM "data" network. Each ATM node has with it a co-located PSTN voice switch. A pair of control links are used to communicate between the two co-located ATM and TDM switches.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

BRIEF DESCRIPTION OF THE DRAWINGS

FIG. 3 illustrates a block diagram of an ATM implementation of the present invention.

FIG. 5 illustrates an interface between a TDM switch and an ATM switch.

DETAILED DESCRIPTION

Figure 1:
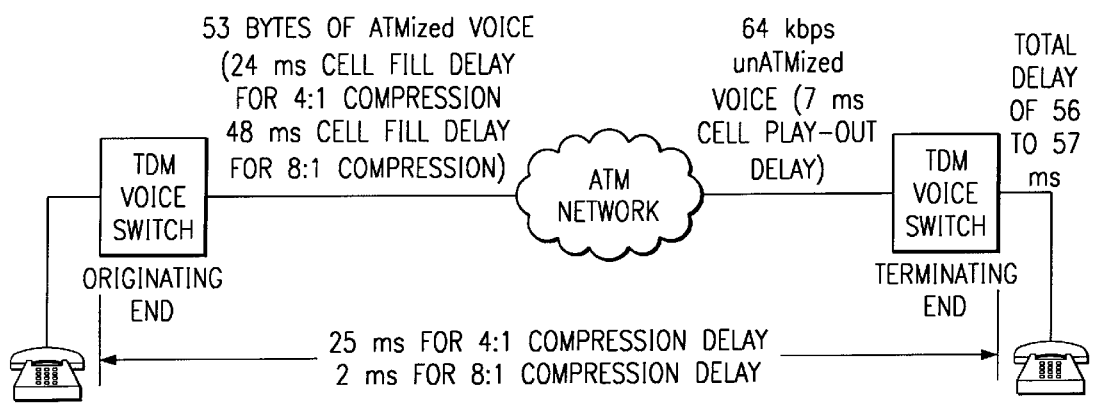
FIG. 1 illustrates a typical voice over ATM network block diagram.
Figure 2:
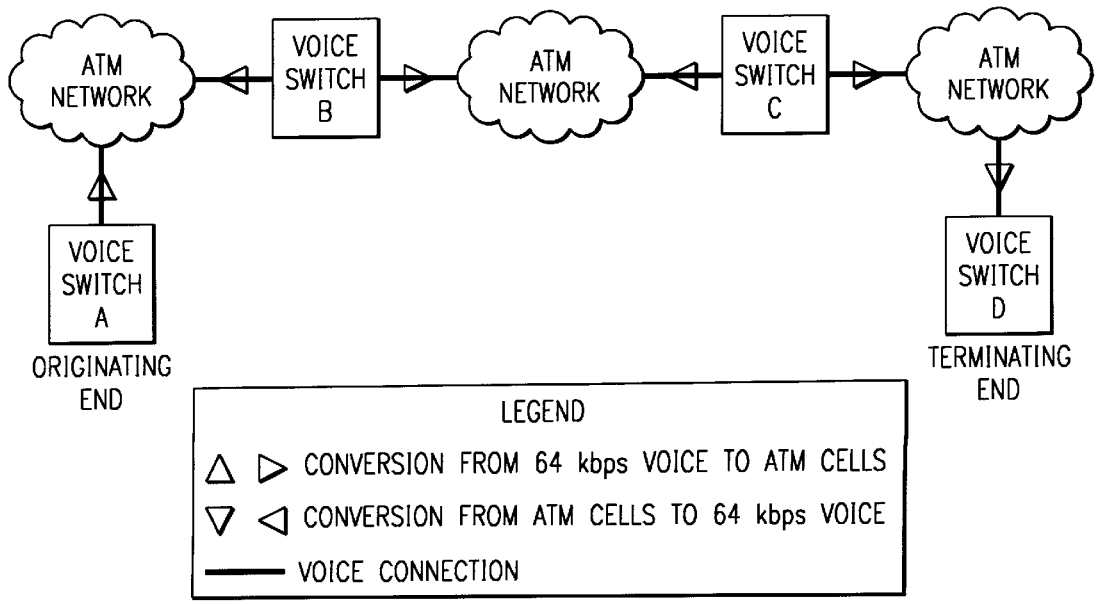
FIG. 2 illustrates a current ATM network block diagram.

Referring now to FIG. 3, an originating terminal places a call to voice switch A302 which is connected a an ATM network 306 through a conversion along path 304 from 64 kb per second to ATM cells. ATM network 306 forwards the ATM voice call over link 308 to ATM switch E 316. ATM switches E and F are co-located with TDM voice switches B and C. Voice switches A and D are the end points that is where the voice path is originated and terminated. These end points do not need to use their co-located ATM switches. ATM network cloud 318 represents an ATM network which has the ATM edge switches at the edge of the network. These switches are responsible for assigning the virtual path/virtual channels (VP/VC). The interfaces between the voice switches and the ATM network could either be public UNI (User Network Interface) or private UNI. It is also assumed that the voice switches have a capability to packetize from 64 kbps voice samples into 53 byte ATM cells and the ATM networks have capability to depacketize the 53 byte ATM cells into 64 kbps voice samples before forwarding the call to the next switch.

During call setup the signal from voice switch A is packetized sent to its corresponding ATM network through the UNI. It then arrives at ATM switch E where it is depacketized and sent to its co-located switch B through the voice connection, Voice switch B looks up its table, finds the corresponding VP/VC route and relays this information to ATM switch E via the control link. ATM switch E then sets up the VP/VC control route towards the ATM switch F through voice switch B's corresponding ATM network. ATM switch a then sets up a three way connection between the given VP/VC route and voice switch B so that the voice switch can stay connected with the call. ATM switch F upon receiving the signaling information depacketizes the received call packet and sends it to voice switch C. Voice switch C then does the same as voice switch B; i.e., it looks up in the table and relays the VP/VC information to its co-located ATM switch F. ATM switch F then sets up the VP/VC route towards ATM network 328.

Figure 4:
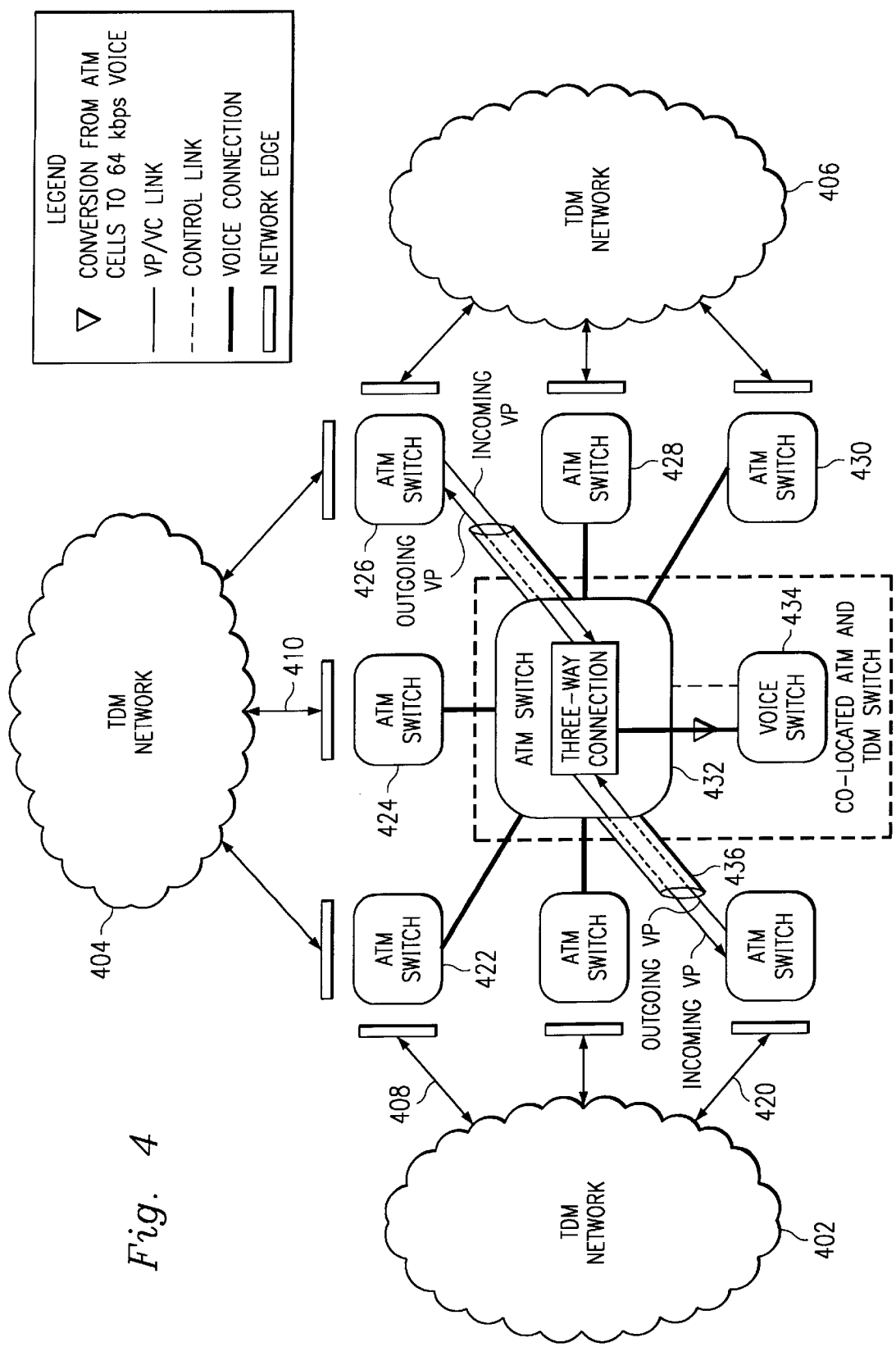
FIG. 4 illustrates a block diagram of virtual path/virtual channel connectivity of the present invention.

Like the previous ATM switch it too sets up a three way connection between VP/VC route and voice switch C to keep the voice switch in communication. The next step is to depacketize the signal before sending it to terminating voice switch D which then forwards the call to the terminating subscriber. Finally the voice path is established as soon as the terminating subscriber goes off hook. FIG. 4 on page 5 shows the voice path after the call has been established. Only two conversions, TDM to ATM and vice a versa are used throughout the entire voice path. According to the proposed implementation, the end to end delay for the same network comes out to be a mere 56 and 57 ms, a significantly smaller number than that of the existing 168 to 171 ms. During call setup, a conversion from ATM to TDM is performed at each TDM voice switch which uses its co-located ATM switch. However, these conversions are done during the call setup and subsequent signaling only which results in little real-time delay effect on the voice transmission.

Savings increase significantly as the network grows to be more complex and since the number of TDM voice switches and their interfaces to the ATM networks also increase. There are at least two key advantages to the instant invention. First is the connection of the co-located ATM switch with the ATM network, second is the interface between the co-located ATM and TDM switches.

FIG. 4 illustrates the concept of connectivity between the ATM network and its co-located ATM switch. It shows how the co-located ATM switch is connected to all other ATM switches which are connected to the network edge. The network edge is the interface between the ATM and TDM network. It is usually the network edges which have primary responsibility for the packetization and depacketization of the voice transmission. However, it is actually a network implementation option and is beyond the scope of the instant invention. It is desirable to maintain the co-located ATM switch as part of the ATM network so that the appropriate routing of the VP/VC is done properly.

FIG. 4 also illustrates the three-way connection between the VP/VC voice path and the voice switch. This three-way bridge allows the voice switch to control the call which in turn enables the co-located ATM switch to set up or break down any VP/VC route across the ATM network before and during the call, providing that IN (Intelligent Network) features can also be made available through the instant invention.

FIG. 5 illustrates the interface between the co-located ATM and TDM switches. As mentioned previously, the interface comprises both control and voice connections. The control link(T1 or Ethernet for example), is used to perform the signaling between these two co-located switches. This control link has to be highly reliable and should be configured with appropriate redundancy such that the communication between them is highly reliable.

Voice connection is used to communicate between the TDM and the ATM domain throughout the call. It is used to collect all the signaling information, dial digits, hook flash, etc. and call setup and if necessary during the call. The voice switch uses this information for call processing. Among other things the routing portion of the call processing is of particular importance. The routing data base contains information about all the trunk resources which are available for a call. The proposed implementation requires the TDM switch to extend its routing data base to include the VP/VC information in addition to the trunk information. That is the voice switch has to map the TDM domain to the ATM domain by tracking the VP/VC and vice versa. At call setup or even during the call if necessary, the voice switch relays this information to its co-located ATM switch so that the ATM switch can route the call through appropriate VP/VC.

Other such embodiments of the invention will be apparent to those skilled in the art from consideration of the specification and practice of the invention disclosed herein. It is readily apparent that the above described invention may be implemented in any type of communication system including a data system. It is intended that the specification and examples be considered as exemplary only, with a true scope and spirit of the invention being indicated by the following claims.

What is claimed is:

1. An apparatus for communicating voice over a digital network by integrating ATM technologies with TDM technologies, the apparatus including:
   a plurality of ATM switches; and
   a plurality of corresponding TDM switches wherein each of said ATM switches is co-located with a corresponding one of said TDM switches and said ATM switches and TDM switches are connected in a network configuration; and
   wherein each of the TDM switches provides virtual path/virtual channel ("VP/VC") information in addition to trunk information and converts a TDM voice/signal stream into ATM packets for the co-located ATM switch to transport the same, and wherein each of said ATM switches sets up a three-way connection to include the co-located TDM switch for controlling a call and providing Intelligent Network features.

2. An apparatus as in claim 1 further including control links between said co-located TDM and ATM switches.

3. An apparatus as in claim 2 wherein the control links may be T1 or Ethernet.

4. An apparatus as in claim 3 further including voice links between said co-located TDM and ATM switches.

5. An apparatus as in claim 4 wherein said voice links comprise a T1 connection.

6. A method of transporting voice over an ATM network in a system including a plurality of ATM switches, a plurality of corresponding TDM switches, wherein each of said ATM switches is co-located with a corresponding one of said TDM switches and, the ATM switches and TDM switches connected in a network configuration wherein each of said ATM switches comprises a traffic transmission controller for setting up a three-way connection to include the co-located TDM switch for controlling calls and providing Intelligent Network features, the method including the steps of:

a) setting up a call over the PSTN;

b) upon the call setup, at each subsequent ATM switch, setting up a three-way connection to include the co-located TDM switch for providing virtual path/ virtual channel ("VP/VC") information in addition to trunk information and for converting a TDM voice/ signal stream into ATM packets for the co-located ATM switch to transport the same; and c) upon call completion, taking down the call over the PSTN.

7. The method of claim 6 further including the step of packetizing voice calls for ATM transport.

8. The method of claim 7 further including the step of controlling traffic at an ATM switch from a co-located PSTN switch.

9. The method of claim 8 further including depacketizing ATM voice calls in a TDM format for transmission to a TDM switch.

10. The method of claim 9 further including routing the ATM voice packet at each sequential node based on predetermined characteristics.

11. The method of claim 10 wherein one of said predetermined characteristics is traffic congestion.

12. The method of claim 10 wherein one of said predetermined characteristics is network failure.

* * * * *

UNITED STATES PATENT AND TRADEMARK OFFICE
CERTIFICATE OF CORRECTION

PATENT NO.    : 6,172,973 B1
DATED         : January 9, 2001
INVENTOR(S)   : Akhtar et al.

It is certified that error appears in the above-identified patent and that said Letters Patent is hereby corrected as shown below:

<u>Column 3</u>,
Line 31, replace "switch a then" with -- switch E then --

Signed and Sealed this

Nineteenth Day of March, 2002

Attest:

JAMES E. ROGAN
*Attesting Officer*    *Director of the United States Patent and Trademark Office*